US012659579B2

(12) United States Patent
Li et al.

(10) Patent No.: US 12,659,579 B2
(45) Date of Patent: Jun. 16, 2026

(54) TECHNIQUES FOR AN OVERHEAD CAMERA

(71) Applicant: Lenovo (Singapore) Pte. Ltd., New Tech Park (SG)

(72) Inventors: Scott Li, Cary, NC (US); Robert J. Kapinos, Durham, NC (US); Robert James Norton, Jr., Raleigh, NC (US); Russell S. VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 212 days.

(21) Appl. No.: 18/543,339

(22) Filed: Dec. 18, 2023

(65) Prior Publication Data

US 2025/0203200 A1     Jun. 19, 2025

(51) Int. Cl.
*H04N 23/667* (2023.01)
*G06F 1/16* (2006.01)
*H04N 23/57* (2023.01)

(52) U.S. Cl.
CPC ......... *H04N 23/667* (2023.01); *G06F 1/1686* (2013.01); *H04N 23/57* (2023.01)

(58) Field of Classification Search
CPC ......... H04N 2201/0436; H04N 23/667; H04N 23/57; G06F 1/1616; G06F 1/1677; G06F 1/1686
See application file for complete search history.

(56) References Cited

U.S. PATENT DOCUMENTS

| | | | |
|---|---|---|---|
| 9,413,931 B2* | 8/2016 | Kuromatsu ........... | G06F 1/1643 |
| 2009/0231483 A1* | 9/2009 | Seddik ................... | H04N 23/56 |
| | | | 348/207.99 |
| 2009/0262200 A1* | 10/2009 | Takabatake .............. | H04N 7/18 |
| | | | 348/207.1 |
| 2009/0262209 A1* | 10/2009 | Pai ..................... | H04N 1/00031 |
| | | | 348/222.1 |
| 2010/0245106 A1* | 9/2010 | Miller ..................... | G06F 3/167 |
| | | | 345/1.3 |
| 2012/0001999 A1* | 1/2012 | Schirdewahn ......... | H04N 7/142 |
| | | | 348/E7.083 |
| 2018/0292866 A1* | 10/2018 | Tucker .................. | G06F 1/1694 |

* cited by examiner

*Primary Examiner* — Timothy J Henn
(74) *Attorney, Agent, or Firm* — Kunzler Needham Hilton

(57) ABSTRACT

Apparatuses, methods, and systems are disclosed for techniques for an overhead camera. An apparatus includes a processor and a memory that stores code that is executable by the processor. The code is executable by the processor to receive hinge position data from at least one hinge sensor, receive orientation data from at least one orientation sensor, and enable at least one camera in an overhead camera mode based on the hinge position data and the orientation data.

20 Claims, 6 Drawing Sheets

100

Camera Mode Apparatus
104

Hinge Module
202

Orientation
Module
204

Camera Module
206

500

600

Start

602    Receive Hinge Position Data From At Least One Hinge Sensor

604    Receive Orientation Data From At Least One Orientation Sensor

606    Determine Optimal Position For Overhead Camera Mode

608    Provide Real-Time Feedback

610    Enable Camera In An Overhead Camera Mode

612    Perform Keystone Correction

End

TECHNIQUES FOR AN OVERHEAD CAMERA

FIELD

The subject matter disclosed herein relates to computing devices and more particularly relates to techniques for an overhead camera.

BACKGROUND

The overhead camera view has proven to be a useful tool for online meetings, interviews, conferences, and various online interactions such as instruction, lectures, and discussions. This camera angle provides a unique perspective that allows presenters to visually demonstrate and explain concepts.

BRIEF SUMMARY

An apparatus for techniques for an overhead camera is disclosed. A method and system also perform the functions of the apparatus. In one embodiment, an apparatus includes a processor and a memory that stores code that is executable by the processor. In one embodiment, the code is executable by the processor to receive hinge position data from at least one hinge sensor, receive orientation data from at least one orientation sensor, and enable at least one camera in an overhead camera mode based on the hinge position data and the orientation data.

In one embodiment, a method for techniques for an overhead camera includes receiving hinge position data from at least one hinge sensor of a computing device, receiving orientation data from at least one orientation sensor of the computing device, and enabling the at least one camera in an overhead camera mode based on the hinge position data and the orientation data.

In one embodiment, a system for techniques for an overhead camera includes at least one camera, a hinge sensor, an orientation sensor, a processor, and a memory that stores code that is executable by the processor. In one embodiment, the code is executable by the processor to receive hinge position data from at least one hinge sensor, receive orientation data from at least one orientation sensor, and enable at least one camera in an overhead camera mode based on the hinge position data and the orientation data.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
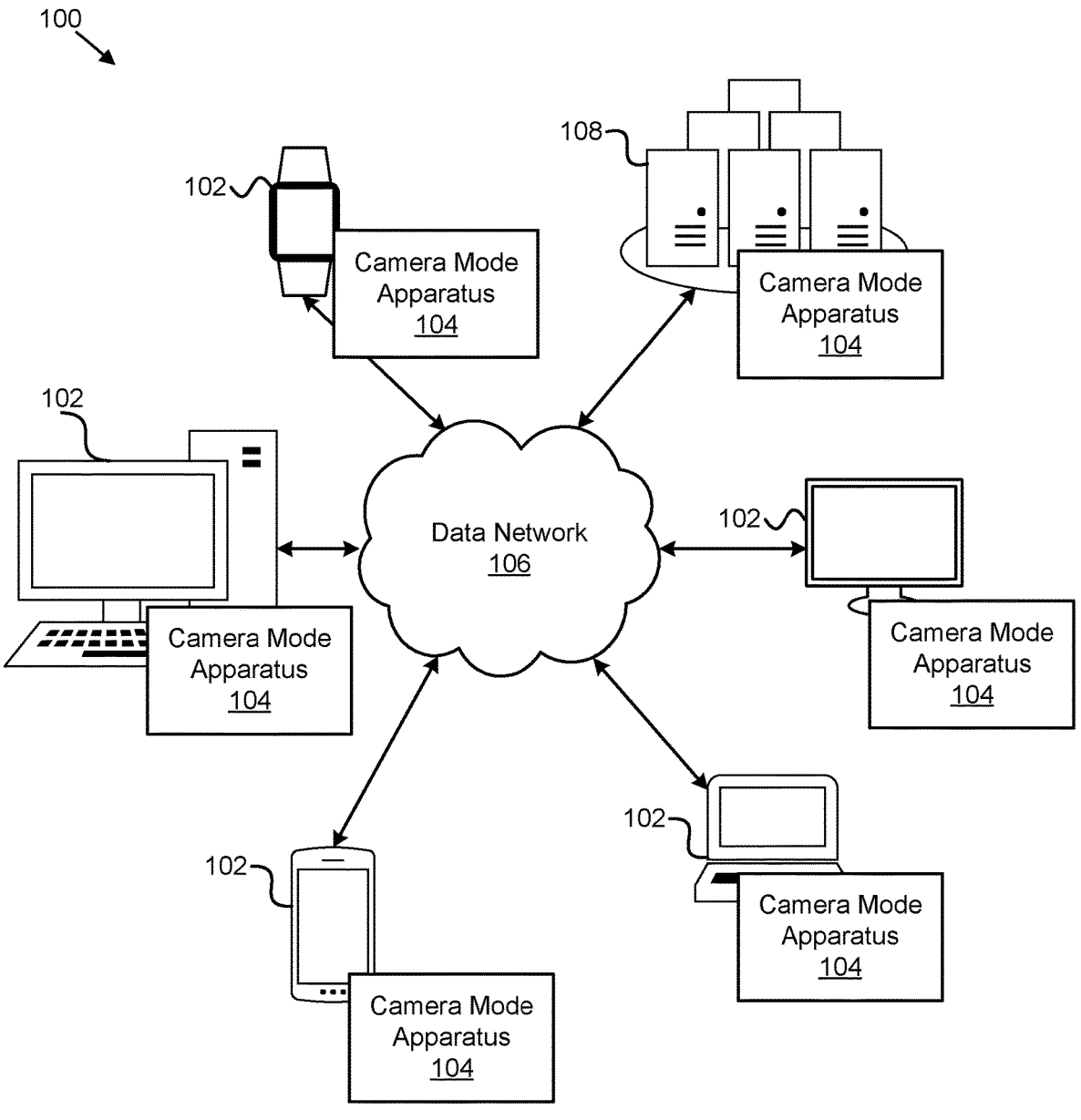
FIG. 1 is a schematic block diagram illustrating one embodiment of a system for techniques for an overhead camera in accordance with the subject matter disclosed herein.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In one embodiment, an apparatus includes a processor and a memory that stores code that is executable by the processor. In one embodiment, the code is executable by the processor to receive hinge position data from at least one hinge sensor, receive orientation data from at least one orientation sensor, and enable at least one camera in an overhead camera mode based on the hinge position data and the orientation data.

In one embodiment, the at least one camera is located on an upper lid portion of the apparatus, the upper lid portion coupled to at least one hinge comprising the at least one hinge sensor. In one embodiment, the code is executable by the processor to enable the at least one camera in response to the hinge position data indicating that the lid is positioned at an angle that satisfies a predetermined angle.

In one embodiment, the at least one camera is located on an interior of the upper lid portion, an exterior of the upper lid portion, or a combination thereof. In one embodiment, the code is executable by the processor to enable the at least one camera in response to the orientation data indicating that a lower lid portion of the apparatus is positioned at a predetermined orientation.

In one embodiment, the code is executable by the processor to further enable the at least one camera in response to determining that an application that uses the camera is executing. In one embodiment, the code is executable by the processor to perform at least one image correction action on content captured with the at least one camera.

In one embodiment, the at least one image correction action comprises a keystone correction action. In one embodiment, the code is executable by the processor to provide feedback in response to the at least one camera being positioned for overhead camera mode. In one embodiment, the feedback comprises haptic feedback, audio feedback, or a combination thereof. In one embodiment, the feedback becomes stronger as the at least one camera approaches an optimal position for the overhead camera mode.

In one embodiment, a method for techniques for an overhead camera includes receiving hinge position data from at least one hinge sensor of a computing device, receiving orientation data from at least one orientation sensor of the computing device, and enabling the at least one camera in an overhead camera mode based on the hinge position data and the orientation data.

In one embodiment, the at least one camera is located on an upper lid portion of the apparatus, the upper lid portion coupled to at least one hinge comprising the at least one hinge sensor. In one embodiment, the method enables the at least one camera in response to the hinge position data indicating that the lid is positioned at an angle that satisfies a predetermined angle.

In one embodiment, the at least one camera is located on an interior of the upper lid portion, an exterior of the upper lid portion, or a combination thereof. In one embodiment, the method enables the at least one camera in response to the orientation data indicating that a lower lid portion of the apparatus is positioned at a predetermined orientation.

In one embodiment, the method enables the at least one camera in response to determining that an application that uses the camera is executing. In one embodiment, the method performs at least one image correction action on content captured with the at least one camera.

In one embodiment, the at least one image correction action comprises a keystone correction action. In one embodiment, the method provides feedback in response to the at least one camera being positioned for overhead camera mode. In one embodiment, the feedback comprises haptic feedback, audio feedback, or a combination thereof. In one embodiment, the feedback becomes stronger as the at least one camera approaches an optimal position for the overhead camera mode.

In one embodiment, a system for techniques for an overhead camera includes at least one camera, a hinge sensor, an orientation sensor, a processor, and a memory that stores code that is executable by the processor. In one embodiment, the code is executable by the processor to receive hinge position data from at least one hinge sensor, receive orientation data from at least one orientation sensor, and enable at least one camera in an overhead camera mode based on the hinge position data and the orientation data.

In one embodiment, the at least one camera is located on an upper lid portion of the apparatus, the upper lid portion coupled to at least one hinge comprising the at least one hinge sensor. In one embodiment, the code is executable by the processor to enable the at least one camera in response to the hinge position data indicating that the lid is positioned at an angle that satisfies a predetermined angle.

In one embodiment, the at least one camera is located on an interior of the upper lid portion, an exterior of the upper lid portion, or a combination thereof. In one embodiment, the code is executable by the processor to enable the at least one camera in response to the orientation data indicating that a lower lid portion of the apparatus is positioned at a predetermined orientation.

In one embodiment, the code is executable by the processor to further enable the at least one camera in response to determining that an application that uses the camera is executing. In one embodiment, the code is executable by the processor to perform at least one image correction action on content captured with the at least one camera.

In one embodiment, the at least one image correction action comprises a keystone correction action. In one embodiment, the code is executable by the processor to provide feedback in response to the at least one camera being positioned for overhead camera mode. In one embodiment, the feedback comprises haptic feedback, audio feedback, or a combination thereof. In one embodiment, the feedback becomes stronger as the at least one camera approaches an optimal position for the overhead camera mode.

The overhead camera view has proven to be a useful tool for online meetings, interviews, conferences, and various online interactions such as instruction, lectures, and discussions. This camera angle provides a unique perspective that allows presenters to visually demonstrate and explain complex concepts, drawings (e.g., architectural plans, logical reasoning processes) and coding flows. Whether it's an architect sketching out building designs, a software engineer diagramming system architectures, or a coding expert explaining algorithms, the overhead camera view enables remote participants to have a clear and detailed visual representation of the presenter's work. It facilitates effective communication and collaboration by eliminating the barriers of physical distance and offers presenters the freedom to simply grab a pen and a piece of paper to draw and write.

Using conventional computer or tablet cameras as overhead cameras, however, presents issues such as distorted images. The subject matter disclosed herein provides for the automated enablement of an overhead camera mode and keystone correction based on hinge and orientation sensor data. Furthermore, solutions are discussed for assisting the user to identify and position the camera at an optimal configuration for an overhead camera mode.

FIG. 1 is a schematic block diagram illustrating one embodiment of a system 100 for techniques for an overhead camera. In one embodiment, the system 100 includes one or more information handling devices 102, one or more camera mode apparatuses 104, one or more data networks 106, and one or more servers 108. In certain embodiments, even though a specific number of information handling devices 102, camera mode apparatuses 104, data networks 106, and servers 108 are depicted in FIG. 1, one of skill in the art will recognize, in light of this disclosure, that any number of information handling devices 102, camera mode apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a micro-controller, and/or another semiconductor integrated circuit device), a volatile memory, and/or a non-volatile storage medium, a display, a connection to a display, and/or the like.

In general, in one embodiment, the camera mode apparatus 104 is configured to determine that a computing device is oriented, positioned, or otherwise configured in an overhead camera mode. As used herein, an overhead camera mode may refer to a mode where a camera of a computing device, such as a laptop, tablet, or other computing device that has a clamshell configuration (e.g., a device that has two parts, an upper portion and a lower portion, that are hinged together and open and close like clamshell), can be used as an overhead camera where the camera is situated above a presentation area and used to capture images or videos from above the presentation area. As described in more detail below, the camera mode apparatus 104 receives hinge position data from a hinge sensor, receives orientation data from an orientation sensor, and enables a camera in an overhead camera mode based on the hinge position data and the orientation data. In this manner, the camera mode apparatus 104 can process image or video data captured in the overhead camera mode to correct for angles, perspectives, skewness, or other image/video issues based on the location/position of the camera. The camera mode apparatus 104 is described in more detail below with reference to FIGS. 2 and 3.

In certain embodiments, the camera mode apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the camera mode apparatus 104 may include a power interface, a wired and/or wireless network interface, a graphical interface that attaches to a display, and/or a semiconductor integrated circuit device as described below, configured to perform the functions described herein with regard to the camera mode apparatus 104.

The camera mode apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a micro-controller, an application-specific integrated circuit ("ASIC"), a processor, a processor core, or the like. In one embodiment, the camera mode apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the camera mode apparatus 104.

The semiconductor integrated circuit device or other hardware appliance of the camera mode apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the camera mode apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), mag-neto-resistive RAM ("MRAM"), dynamic RAM ("DRAM"), phase change RAM ("PRAM" or "PCM"), magnetic storage media (e.g., hard disk, tape), optical stor-age media, or the like.

The data network 106, in one embodiment, includes a digital communication network that transmits digital com-munications. The data network 106 may include a wireless network, such as a wireless cellular network, a local wireless network, such as a Wi-Fi network, a Bluetooth® network, a near-field communication ("NFC") network, an ad hoc net-work, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alterna-tively, the wireless connection may be a Bluetooth® con-nection. In addition, the wireless connection may employ a Radio Frequency Identification ("RFID") communication including RFID standards established by the International Organization for Standardization ("ISO"), the International Electrotechnical Commission ("IEC"), the American Soci-ety for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innova-tions Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower serv-ers, rack servers, and/or the like. The one or more servers 108 may be configured as mail servers, web servers, appli-cation servers, FTP servers, media servers, data servers, web servers, file servers, virtual servers, and/or the like. The one or more servers 108 may be communicatively coupled (e.g., networked) over a data network 106 to one or more infor-mation handling devices 102 and may be configured to execute or run machine learning algorithms, programs, applications, processes, and/or the like.

Figure 2:
FIG. 2 is a schematic block diagram illustrating one embodiment of an apparatus for techniques for an overhead camera in accordance with the subject matter disclosed herein.
Figure 2:
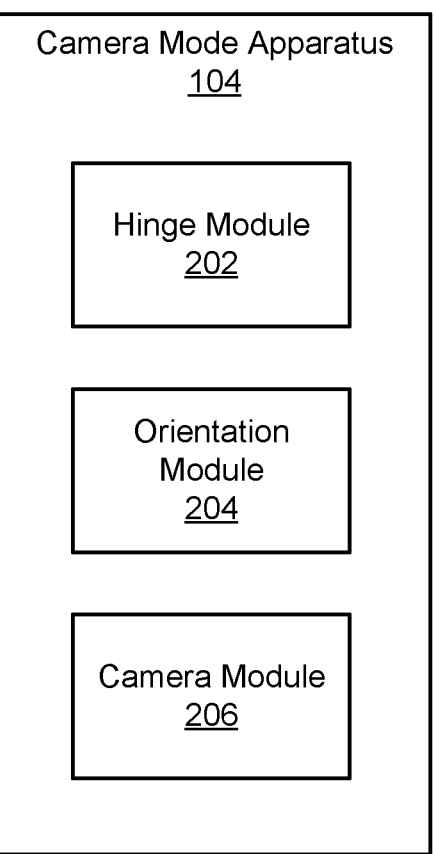

FIG. 2 is a schematic block diagram illustrating one embodiment of an apparatus 200 for techniques for an overhead camera. In one embodiment, the apparatus 200 includes an instance of a camera mode apparatus 104. In one embodiment, the camera mode apparatus 104 includes one or more of a hinge module 202, an orientation module 204, and a camera module 206, which are described in more detail below.

In one embodiment, the hinge module 202 is configured to receive hinge position data from at least one hinge sensor. A hinge sensor, as used herein, may include a sensor that is integrated with, built into, connected or coupled with, or the like, a hinge of a clamshell-type computing device, e.g., a laptop computer. The hinge sensor may receive, detect, or otherwise capture hinge position data, which may include data that indicates the position of an upper lid of a clamshell-type computing device (e.g., the portion housing the screen/monitor) relative to the lower lid (e.g., the portion housing the keyboard, a motherboard, and/or other hardware com-ponents). For instance, the hinge position data may include an angle value (e.g., a degree) describing the angle between the upper lid and the lower lid, a position of the hinge from a base position (e.g., a closed lid position), a voltage value that is based on a resistance and how the hinge is rotated, a value indicating whether the upper lid portion is open or closed, and/or the like.

In one embodiment, the hinge module 202 receives the hinge position data directly from a hinge sensor, from an operating system, from a firmware (e.g., a firmware for the hinge sensor, a basic input/output system, or the like), from a database or other data store, and/or the like. The hinge module 202 may receive hinge position data in response to the hinge being actuated, e.g., in response to the upper lid portion being moved relative to the lower lid portion, may receive hinge position data in response to a camera on the upper lid portion, e.g., a front-facing camera, a world-facing camera, or the like being positioned to be used as an overhead camera (e.g., based on position/orientation data, discussed below), and/or the like.

In one embodiment, the orientation module 204 receives orientation data from at least one orientation sensor. As used herein, an orientation sensor may refer to a sensor that detects changes in orientation of a device. Examples of orientation sensors may include accelerometers, gyroscopes, and/or the like. Accordingly, the orientation data may include coordinate data (e.g., x-, y-, z-coordinates), or other data that indicates a position/orientation of the device rela-tive to a horizontal, or other, plane or reference. As it relates to the subject matter herein, the orientation module 204 may receive orientation data that is captured by an orientation sensor to determine how a clamshell-configured device is oriented.

For instance, a laptop computer that is configured as a folding device (e.g., a device where the hinges allow the upper lid portion to rotate almost 180 degrees such that the back of the upper lid portion is positioned against the back of the lower lid portion) may be setup where a keyboard of the lower lid portion is facing downward, e.g., positioned against a desktop and the upper lid portion is rotated and positioned so that the front-facing camera can be used as an overhead camera. In such an embodiment, the orientation module 204 may use the orientation data from the orienta-tion sensor to determine, calculate, recognize, or the like the orientation, position, configuration, or the like of the laptop computer.

In one embodiment, the orientation module 204 receives the orientation data directly from an orientation sensor, from an operating system, from a firmware (e.g., a firmware for the orientation sensor, a basic input/output system, or the like), from a database or other data store, and/or the like. The orientation module 204 may receive orientation data in response to an orientation of the device changing, being at a predefined position, or the like, e.g., in response to the device being folded, placed on a stand (e.g., positioned at a 45 degree, or similar, angle), situated with the lower lid portion facing down, positioned on an angle, and/or the like.

In one embodiment, the camera module 206 enables at least one camera in an overhead camera mode based on the hinge position data and the orientation data. For example, in response to the orientation data indicating that a folding device is configured with the lower lid portion in a predetermined orientation, a predefined orientation, a threshold orientation, or the like, e.g., facing downward and the hinge position data indicating that the upper lid portion is positioned at a predetermined angle, a predefined angle, a threshold angle, or the like, or within a range of predefined or threshold angles, e.g., a 45 degree angle, such that the front-facing camera is facing outward, e.g., facing a desktop or other surface, the camera module 206 may determine that the device is configured to be used as an overhead camera and activate the front-facing camera.

In one embodiment, the camera module 206 enables at least one camera in an overhead camera mode based further on determining that an application that uses the camera is executing. For instance, if a video conferencing program (e.g., Zoom), a presentation program (e.g., PowerPoint), or the like is executing on a device while the device is configured or positioned in an overhead camera configuration, based on the hinge position data and the orientation data, the camera module 206 may enable the camera for use as an overhead camera.

In this manner, the camera mode apparatus 104 can use real-time sensor data—hinge position data and orientation data—to determine how a user intends to use the device, and in particular the camera of the device, to automatically enable or configure the device to be used in an overhead camera mode, which may include performing various image correction actions/functions, described in more detail below.

Figure 3:
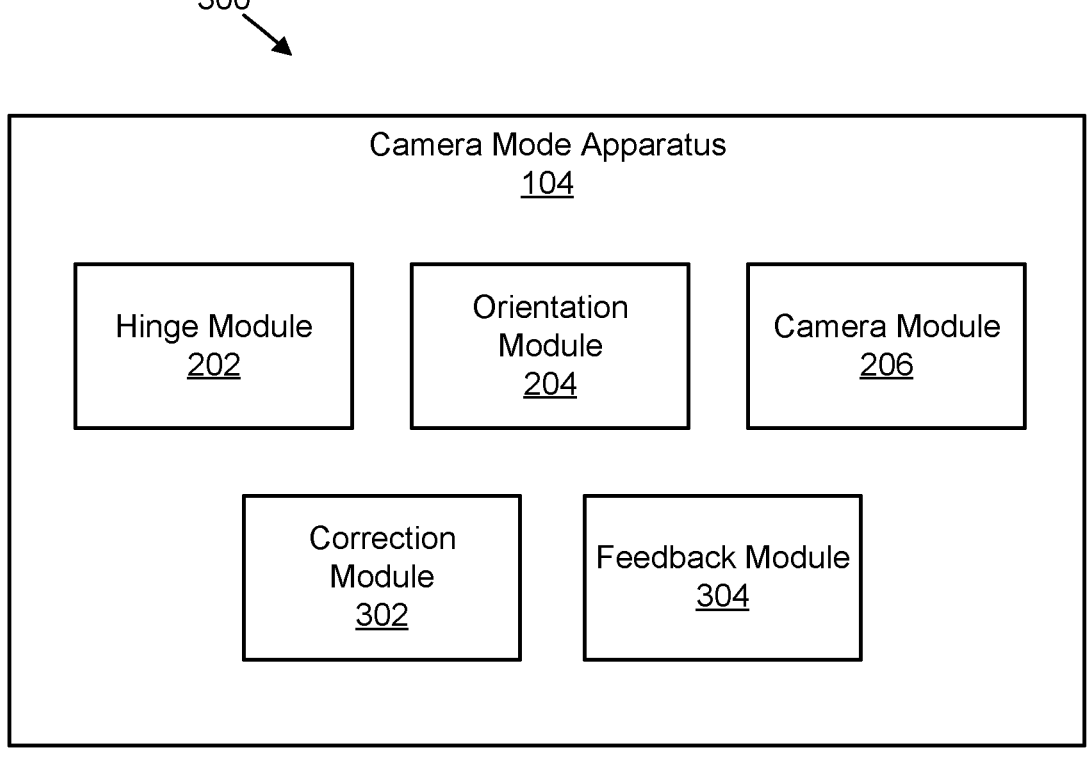
FIG. 3 is a schematic block diagram illustrating one embodiment of an apparatus for techniques for an overhead camera in accordance with the subject matter disclosed herein.

FIG. 3 is a schematic block diagram illustrating one embodiment of an apparatus 300 for techniques for an overhead camera. In one embodiment, the apparatus 300 includes an instance of a camera mode apparatus 104. In one embodiment, the camera mode apparatus 104 includes one or more of a hinge module 202, an orientation module 204, and a camera module 206, which may be substantially similar to the hinge module 202, the orientation module 204, and the camera module 206 described above. In one embodiment, the camera mode apparatus 104 includes a correction module 302 and a feedback module 304, which are described in more detail below.

In one embodiment, the correction module 302 is configured to perform at least one image correction action on content captured with the at least one camera. The correction module 302, for instance, may perform various image or video processing functions to correct or improve various aspects of the image or video that the camera captures such as an aspect ratio, a perspective, an alignment, a color, a brightness, a sharpness, and/or the like.

In one embodiment, the correction module 302 performs a keystone correction action on images/videos that the camera captures. As used herein, keystone correction may refer to the output of an image/video from a camera that is not placed perpendicular to a horizontal centerline (e.g., too high/low) to correct for skewness in the output and make the output rectangular/square instead of having a trapezoidal perspective. In other words, when capturing images/video from an overhead camera perspective, there can be distortion that causes rectangular/square objects to appear trapezoidal due to the angle of the camera. To compensate for the distortion and restore the correct proportions, keystone correction is applied to digitally adjust the image/video and correct the distortion.

In one embodiment, the correction module 302 performs keystone correction in real-time. For instance as the upper lid portion is adjusted or moved, changing the angle of the camera relative to the object that is being captured, the correction module 302 performs keystone correction in real-time to compensate for the change in distortion of the camera output.

In one embodiment, the correction module 302 may utilize the hinge position data, e.g., the hinge angle, to calculate or optimize the keystone correction application because the hinge angle is proportional to the amount of distortion. Moreover, the correction module 302 may utilize the orientation of the device (relative to a known reference point such as a horizontal plane) a device's specifications, e.g., size, dimensions, or the like, to efficiently optimize the keystone correction by incorporating these parameters into the calculations that are performed for keystone correction.

In one embodiment, the feedback module 304 is configured to provide feedback in response to the at least one camera being positioned for overhead camera mode. The feedback module 304, for instance, may provide haptic feedback (e.g., vibrations), audio feedback (e.g., tones, beeps, speech), and/or the like. In certain embodiments, in response to the camera being moved to an optimal position, the feedback module 304 provides stronger or louder feedback as the camera gets closer to an optimal position. As used herein, the optimal position may be a position of the camera that provides the best perspective, the least distortion, and/or the like, and the camera module 206 may determine the optimal position based on the hinge position data, the orientation data, the specifications of the device, e.g., the location of the camera on the device, the location of the object(s) that is being capture (e.g., a document), and/or the like.

For example, as a user rotates an upper lid portion to place the camera in an overhead camera position, the closer the upper lid portion gets to an optimal position, vibrations may become stronger or faster, audio tones may become louder or faster, and/or the like. The feedback module 304 may determine the optimal position based on the dimensions or characteristics of the device, the orientation of the device relative to a reference point (e.g., a horizontal plane), and the hinge position data.

Figure 4A:
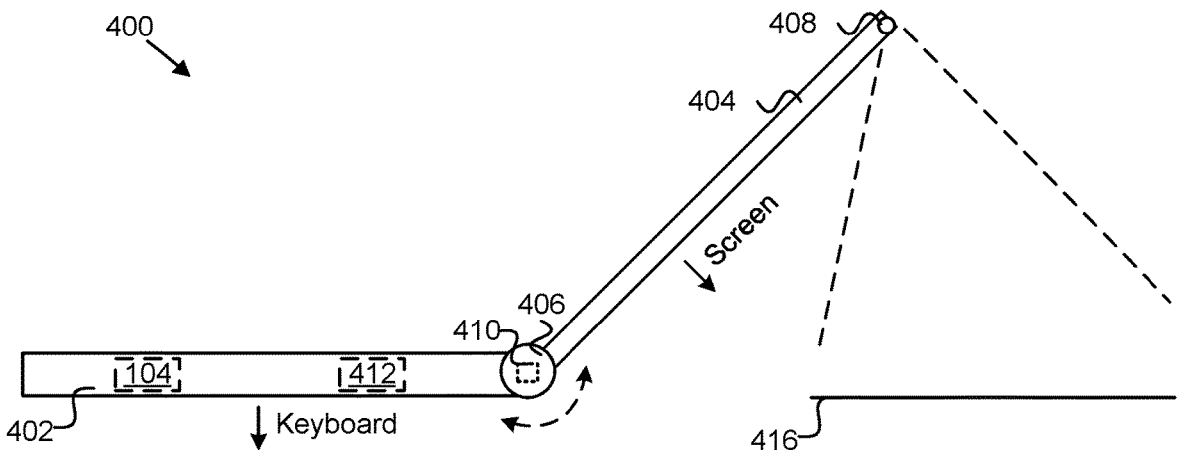
FIG. 4A is an example of a device configuration for techniques for an overhead camera in accordance with the subject matter disclosed herein.

FIG. 4A depicts one embodiment of a foldable device as described herein. In one embodiment, a foldable device 400 is configured or positioned in an overhead camera mode where the upper lid portion 404 is rotated about a hinge 406 and away from the lower lid portion 402 such that the keyboard faces downward, and the screen faces outward. In such an embodiment, a hinge sensor 410 and an orientation sensor 412 may be used to determine the angle of the upper lid portion 404 relative to the lower lid portion 402 and the orientation of the device relative to a reference point, e.g., a horizontal plane. In one embodiment, when upper lid portion 404 is rotated relative to the lower lid portion 402, the feedback module 304 provides real-time feedback to indicate when the upper lid portion 404, and particularly the camera 408, is in an optimal position for the overhead camera mode. Furthermore, as the upper lid portion 404 is rotated, the correction module 302 performs real-time keystone correction of the image/video of an object 416, based on the hinge position data from the hinge sensor 410 and/or the orientation data from the orientation sensor 412.

Figure 4B:
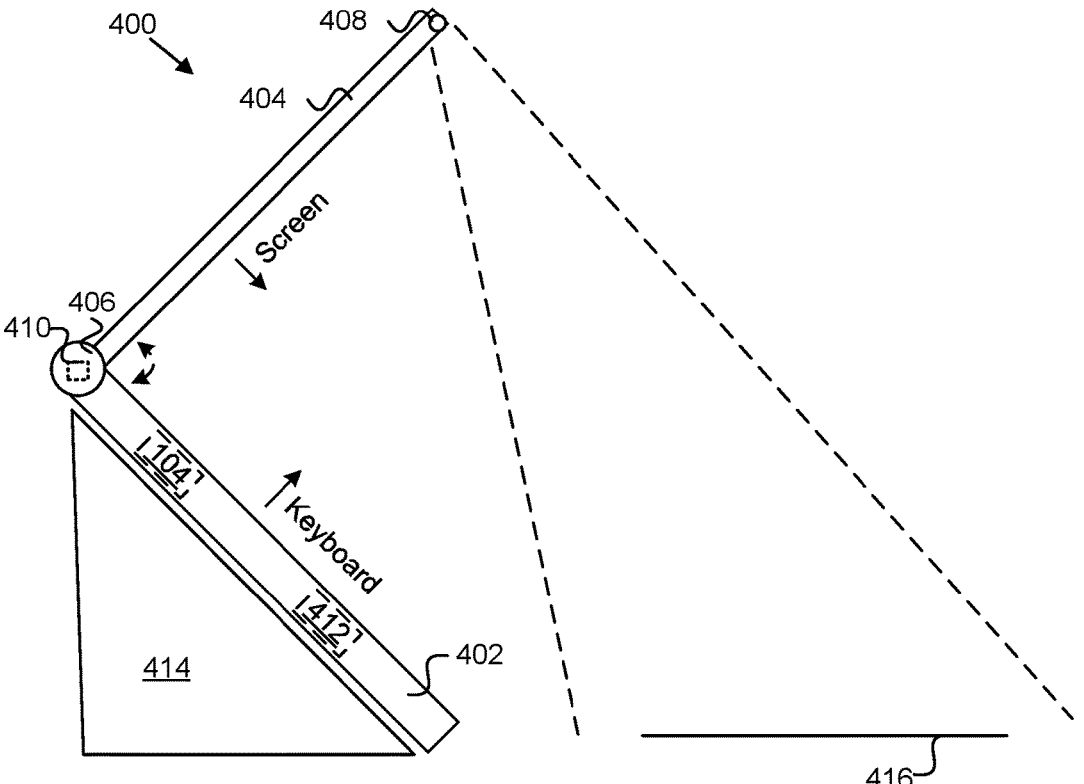
FIG. 4B is an example of a device configuration for techniques for an overhead camera in accordance with the subject matter disclosed herein.

FIG. 4B depicts one embodiment of a foldable device as described herein. In one embodiment, a foldable device 400 is configured or positioned in an overhead camera mode while being placed on stand 414 as opposed to a flat surface as shown in FIG. 4A. Accordingly, the camera module 206 can accommodate for the orientation of the device 400 using the orientation data from the orientation sensor 412 and the hinge position data from the hinge sensor 410. In certain embodiments, the lower lid portion 402 includes a second screen that may be used to view the camera output in real-time to assist with positioning the upper lid portion in an optimal position for the overhead camera mode.

Figure 5:
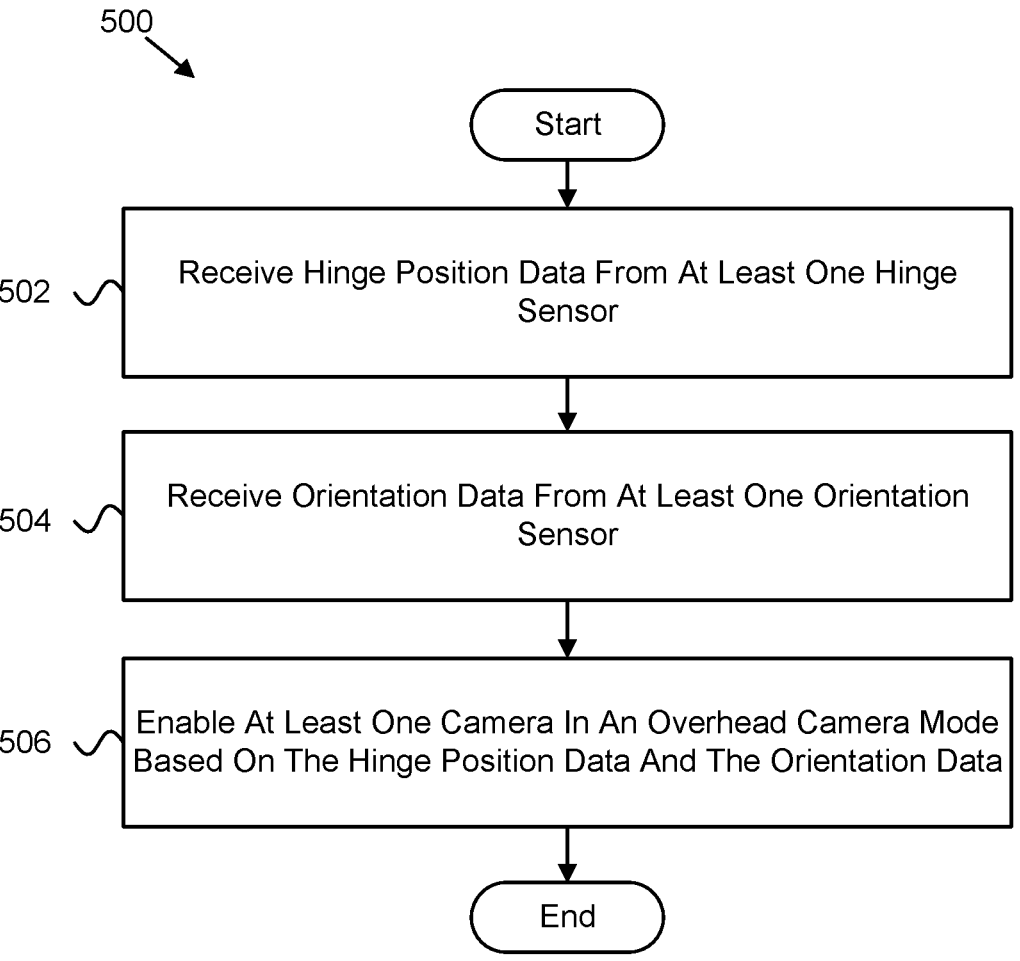
FIG. 5 is a schematic flow chart diagram illustrating one embodiment of a method for techniques for an overhead camera in accordance with the subject matter disclosed herein.

FIG. 5 depicts one embodiment of a method 500 for techniques for an overhead camera. In one embodiment, the camera mode apparatus 104, the hinge module 202, the orientation module 204, and/or the camera module 206 perform the various steps of the method 500.

In one embodiment, the method 500 begins and receives 502 hinge position data from at least one hinge sensor, receives 504 orientation data from at least one orientation sensor, and enables 506 at least one camera in an overhead camera mode based on the hinge position data and the orientation data, and the method 500 ends.

Figure 6:
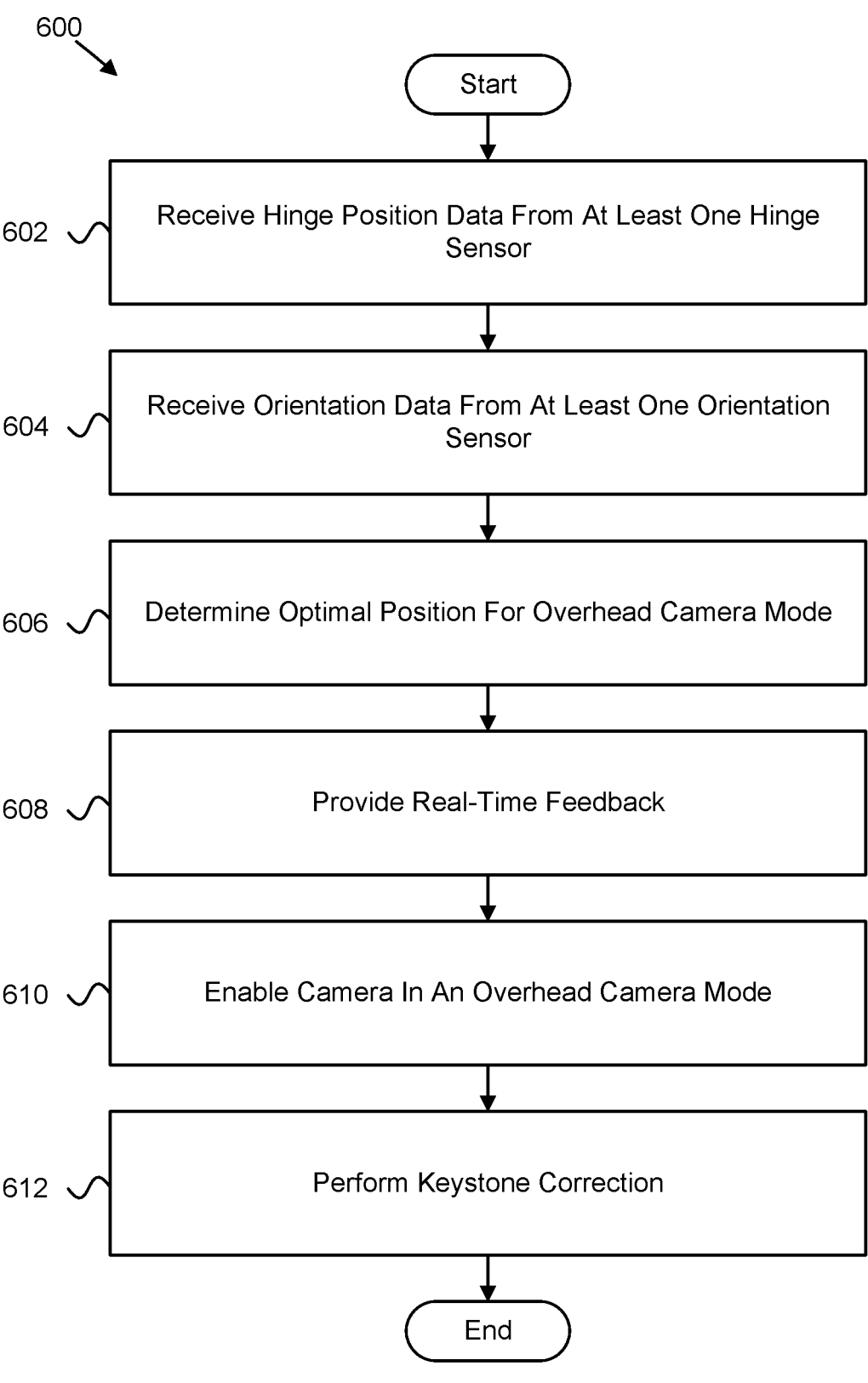
FIG. 6 is a schematic flow chart diagram illustrating one embodiment of another method for techniques for an overhead camera in accordance with the subject matter disclosed herein.

FIG. 6 depicts one embodiment of a method 600 for techniques for an overhead camera. In one embodiment, the camera mode apparatus 104, the hinge module 202, the orientation module 204, the camera module 206, the correction module 302, and/or the feedback module 304 perform the various steps of the method 600.

In one embodiment, the method 600 begins and receives 602 hinge position data from at least one hinge sensor and receives 604 orientation data from at least one orientation sensor. In one embodiment, the method 600 determines 606 an optimal position for the camera based on the hinge position and orientation data.

In one embodiment, the method 600 provides 608 real-time feedback for placing the camera in the optimal position and enables 610 the camera in an overhead camera mode. In one embodiment, the method 600 performs 612 keystone correction on the image/video data that the camera captures (based on the orientation and hinge position data), and the method 600 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor; and
a memory that stores code executable by the processor to:
    receive hinge position data from at least one hinge sensor;
    receive orientation data from at least one orientation sensor; and
    enable at least one camera in an overhead camera mode in response to the hinge position data indicating that an upper lid portion satisfies a predetermined hinge angle range and the orientation data indicating that a lower lid portion satisfies a predetermined chassis orientation.

2. The apparatus of claim 1, wherein the at least one camera is located on the upper lid portion of the apparatus, the upper lid portion coupled to at least one hinge comprising the at least one hinge sensor.

3. The apparatus of claim 1, wherein the at least one camera is located on an interior of the upper lid portion, an exterior of the upper lid portion, or a combination thereof.

4. The apparatus of claim 1, wherein the code is executable by the processor to further enable the at least one camera in response to determining that an application that uses the camera is executing.

5. The apparatus of claim 1, wherein the code is executable by the processor to perform at least one image correction action on content captured with the at least one camera.

6. The apparatus of claim 5, wherein the at least one image correction action comprises a keystone correction action.

7. The apparatus of claim 1, wherein the code is executable by the processor to provide feedback in response to the at least one camera being positioned for overhead camera mode.

8. The apparatus of claim 7, wherein the feedback comprises haptic feedback, audio feedback, or a combination thereof.

9. The apparatus of claim 8, wherein the feedback becomes stronger as the at least one camera approaches an optimal position for the overhead camera mode.

10. A method, comprising:
    receiving hinge position data from at least one hinge sensor of a computing device;
    receiving orientation data from at least one orientation sensor of the computing device; and
    enabling at least one camera in an overhead camera mode in response to the hinge position data indicating that an upper lid portion satisfies a predetermined hinge angle range and the orientation data indicating that a lower lid portion satisfies a predetermined chassis orientation.

11. The method of claim 10, wherein the at least one camera is located on the upper lid portion of the computing device, the upper lid portion coupled to at least one hinge comprising the at least one hinge sensor.

12. The method of claim 10, further comprising enabling the at least one camera in response to determining that an application that uses the camera is executing.

13. The method of claim 10, further comprising performing at least one image correction action on content captured with the at least one camera.

14. The method of claim 10, further comprising providing feedback in response to the at least one camera being positioned for overhead camera mode.

15. The method of claim 14, wherein the feedback comprises haptic feedback, audio feedback, or a combination thereof.

16. The method of claim 15, wherein the feedback becomes stronger as the at least one camera approaches an optimal position for the overhead camera mode.

17. The method of claim 13, wherein the at least one image correction action comprises a keystone correction action.

18. The method of claim 10, wherein the at least one camera is located on an interior of the upper lid portion, an exterior of the upper lid portion, or a combination thereof.

19. A system comprising:
    at least one camera;
    a hinge sensor;
    an orientation sensor;
    a processor; and
    a memory that stores code executable by the processor to:

receive hinge position data from at least one hinge sensor;

receive orientation data from at least one orientation sensor; and enable at least one camera in an overhead camera mode in response to the hinge position data indicating that an upper lid portion satisfies a predetermined hinge angle range and the orientation data indicating that a lower lid portion satisfies a predetermined chassis orientation.

20. The system of claim 19, wherein the at least one camera is located on the upper lid portion, the upper lid portion coupled to at least one hinge comprising the at least one hinge sensor.

\* \* \* \* \*